US009322327B2

(12) United States Patent
Lombard et al.

(10) Patent No.: US 9,322,327 B2
(45) Date of Patent: Apr. 26, 2016

(54) TURBOCHARGER WITH BYPASS VALVE PROVIDING COMPLETE BYPASS OF THE TURBINE FOR IMPROVED CATALYST LIGHT-OFF

(71) Applicant: Honeywell International Inc., Morristown, NJ (US)

(72) Inventors: Alain Lombard, Vosges (FR); Johann Kurtzmann, Lorraine (FR); Michael Ladonnet, Vosges (FR)

(73) Assignee: Honeywell International Inc., Morris Plains, NJ (US)

( * ) Notice: Subject to any disclaimer, the term of this patent is extended or adjusted under 35 U.S.C. 154(b) by 379 days.

(21) Appl. No.: 13/928,034

(22) Filed: Jun. 26, 2013

(65) Prior Publication Data

US 2015/0000270 A1    Jan. 1, 2015

(51) Int. Cl.
| | | |
|---|---|---|
| *F02D 23/00* | (2006.01) | |
| *F16K 3/08* | (2006.01) | |
| *F16K 47/08* | (2006.01) | |
| *F02B 47/08* | (2006.01) | |
| *F01N 3/20* | (2006.01) | |
| *F02B 37/18* | (2006.01) | |
| *F02B 39/00* | (2006.01) | |

(Continued)

(52) U.S. Cl.
CPC ............... *F02B 47/08* (2013.01); *F01D 25/24* (2013.01); *F01D 25/30* (2013.01); *F01N 3/2006* (2013.01); *F02B 37/183* (2013.01); *F02B 39/00* (2013.01); *F05B 2220/40* (2013.01)

(58) Field of Classification Search
CPC .......... F02B 37/18; F02B 37/186; F16K 3/08; F16K 3/085; F16K 3/34

USPC ............................ 60/602; 137/625.31, 625.3
See application file for complete search history.

(56) References Cited

U.S. PATENT DOCUMENTS

| | | | | |
|---|---|---|---|---|
| 1,969,375 A | * | 8/1934 | Laurent ......................... | 251/192 |
| 3,924,832 A | * | 12/1975 | Babcock .................. | 137/625.45 |
| 4,244,187 A | | 1/1981 | Lane et al. | |

(Continued)

FOREIGN PATENT DOCUMENTS

| | | | | |
|---|---|---|---|---|
| DE | 10222917 A1 | * | 12/2003 | .............. F02B 37/18 |
| DE | 102005045387 A1 | * | 3/2007 | .............. F01D 17/12 |

(Continued)

OTHER PUBLICATIONS

EP Search Report and Opinion for EP Application No. 14172032.6-1603, dated Dec. 5, 2014.

*Primary Examiner* — Thai Ba Trieu
(74) *Attorney, Agent, or Firm* — John C. James

(57) ABSTRACT

A turbocharger includes a turbine housing defining an exhaust gas inlet, and an exhaust gas exit. The turbine housing is integrated with a housing for a 3-way valve defining a primary through-passage that supplies exhaust gas directly to a catalyst. The exhaust gas inlet is connected to a bypass passage of the valve that allows exhaust gases to flow to the turbine before going to the catalyst. The valve includes a rotary element whose position is controllable to regulate flow through each of the primary through-passage and the bypass passage of the valve. The rotary element is rotatable over a first range of movement and a further second range of movement, the first range including a position in which the bypass passage is substantially fully closed. Over the second range the bypass passage is fully open regardless of the degree of opening or closing of the primary through-passage.

15 Claims, 11 Drawing Sheets

(51) Int. Cl.
*F01D 25/24* (2006.01)
*F01D 25/30* (2006.01)

(56) References Cited

U.S. PATENT DOCUMENTS

| | | | |
|---|---|---|---|
| 4,404,804 A | 9/1983 | Tadokoro et al. | |
| 4,463,564 A * | 8/1984 | McInerney | 60/602 |
| 4,554,943 A * | 11/1985 | Claney et al. | 137/625.31 |
| 5,014,748 A * | 5/1991 | Nogami et al. | 137/625.65 |
| 5,146,752 A * | 9/1992 | Bruestle | 60/602 |
| 5,842,680 A * | 12/1998 | Bustamante et al. | 251/65 |
| 5,943,864 A * | 8/1999 | Sumser et al. | 60/602 |
| 6,543,228 B2 | 4/2003 | Deacon | |
| 6,715,289 B2 * | 4/2004 | Mader et al. | 60/612 |
| 6,983,596 B2 * | 1/2006 | Frankenstein et al. | 60/602 |
| 7,051,527 B2 * | 5/2006 | Schmid et al. | 60/602 |
| 7,243,495 B2 * | 7/2007 | Whelan et al. | 60/605.2 |
| 7,637,106 B2 * | 12/2009 | Hertweck et al. | 60/602 |
| 7,785,727 B2 * | 8/2010 | Degner et al. | 137/625.31 |
| 8,234,865 B2 | 8/2012 | Andrews | |
| 8,353,664 B2 * | 1/2013 | Lombard et al. | 60/602 |
| 8,516,814 B2 * | 8/2013 | Okada | 60/602 |
| 8,678,755 B2 * | 3/2014 | Lombard et al. | 60/602 |
| 8,684,675 B2 * | 4/2014 | Lombard et al. | 60/602 |
| 8,740,183 B2 * | 6/2014 | Hauri et al. | 137/625.31 |
| 2002/0078934 A1 | 6/2002 | Hohkita et al. | |
| 2007/0089413 A1 | 4/2007 | Green et al. | |
| 2008/0173016 A1 | 7/2008 | Barthelet | |
| 2011/0103936 A1 | 5/2011 | Lombard et al. | |
| 2011/0268559 A1 | 11/2011 | Lombard et al. | |
| 2012/0255297 A1 | 10/2012 | Boning et al. | |
| 2013/0251512 A1 * | 9/2013 | Lombard et al. | 415/125 |

FOREIGN PATENT DOCUMENTS

| | | | | |
|---|---|---|---|---|
| DE | 102009049993 A1 | | 4/2011 | |
| EP | 266256 A1 * | | 5/1988 | F02B 37/12 |
| EP | 1338785 A2 * | | 8/2003 | F02M 25/07 |
| EP | 1 152 133 B1 | | 7/2006 | |
| EP | 1939427 A2 | | 7/2008 | |
| EP | 2306054 A1 * | | 4/2011 | F16K 3/08 |
| JP | 01063607 A * | | 3/1989 | F01D 17/14 |
| JP | 2007315173 A * | | 12/2007 | F02B 37/00 |
| JP | 2010053788 A * | | 3/2010 | F02B 37/18 |

* cited by examiner

TURBOCHARGER WITH BYPASS VALVE PROVIDING COMPLETE BYPASS OF THE TURBINE FOR IMPROVED CATALYST LIGHT-OFF

CROSS-REFERENCE TO RELATED APPLICATIONS

This application is related to U.S. patent application Ser. No. 12/611,816 filed on Nov. 3, 2009, and to U.S. Provisional Application No. 61/422,485 filed on Dec. 13, 2010, the entire disclosures of said applications being hereby incorporated herein by reference.

BACKGROUND OF THE INVENTION

The present disclosure relates to exhaust gas-driven turbochargers, and particularly to bypass arrangements that allow exhaust gas to bypass the turbine under certain engine operating conditions.

In order for an internal combustion engine to meet emission limits set by regulatory authorities, it is generally necessary to employ a catalyst system to reduce certain emission components to acceptable levels. The conversion efficiency of a catalyst is quite low when the catalyst is below a certain temperature, generally known as the "light-off" temperature. In a cold start of the engine, the catalyst is well below the light-off temperature, and hence the catalyst system has little effectiveness at reducing emissions. Accordingly, there is a need to hasten the heating of the catalyst as much as possible in order to minimize the amount of undesirable exhaust components emitted prior to light-off.

The cold-start problem is exacerbated by the presence of a turbocharger. In a conventional turbocharged engine system in which exhaust gases must pass through the turbine before reaching the catalyst, the turbocharger represents a heat sink for the exhaust stream. While turbochargers typically include a bypass valve or waste gate that can be activated to route the majority of the exhaust gas stream to the catalyst without having to pass through the turbine, conventional bypass valves or waste gates still allow a considerable amount of exhaust gas to pass through the turbine. This exhaust gas is cooled by the turbine and therefore slows the heating of the catalyst, delaying the attainment of light-off temperature.

BRIEF SUMMARY OF THE DISCLOSURE

The present disclosure describes one or more embodiments of turbochargers having a novel bypass arrangement that seeks to address issues such as the ones noted above. In one embodiment, a single-stage turbocharger system includes a catalytic exhaust gas treatment device that requires heating to at least a minimum temperature in order to become effective for treating exhaust gases to reduce emissions. The system includes an exhaust line arranged for conveying exhaust gases from an engine to the catalytic exhaust gas treatment device, and a 3-way valve disposed in the exhaust line. The valve defines a primary through-passage that, when open, conveys exhaust gases from the exhaust line directly to the catalytic exhaust gas treatment device, and further defines a bypass passage that, when open, diverts a bypass flow of exhaust gases away from the primary through-passage.

The system further comprises a single-stage turbocharger comprising a compressor wheel mounted within a compressor housing and a turbine wheel mounted within a turbine housing and connected to the compressor wheel by a shaft. The turbine housing defines an exhaust gas inlet connected to a turbine volute that surrounds the turbine wheel, and an exhaust gas exit for discharging exhaust gases that have passed through the turbine wheel. The exhaust gas inlet of the turbine housing is connected to the bypass passage of the valve, and the exhaust gas exit of the turbine housing is connected to the exhaust line at a point spaced downstream from the valve.

The valve includes a rotary element whose position is controllable to selectively open or close, and to vary a degree of opening or closing of, each of the primary through-passage and the bypass passage of the valve. The valve is constructed such that the rotary element is rotatable over a first range of rotary movement and over a further second range of rotary movement, the first range including a position of the rotary element in which the bypass passage (i.e., the passage leading to the turbine inlet) is substantially fully closed. Over the second range the bypass passage is fully open regardless of changes in the degree of opening or closing of the primary through-passage. Thus, in contrast to conventional turbocharger systems having a waste gate that merely opens an alternative flow path to the exhaust gases without positively closing the flow path to the turbine, the valve in the present system is able to positively close the flow path to the turbine so that all or substantially all of the exhaust gases proceed to the catalytic treatment device without first passing through the turbine. The result is a decrease in the time required for the catalyst to reach its activation temperature. Additionally, the valve is able to alter, in a coordinated fashion, the opening of the bypass passage and corresponding closing of the primary through-passage (or, vice versa) over the first range of movement of the rotary element. Then, over the second range, the valve is able to regulate the degree of opening of the primary through-passage while maintaining the bypass passage to the turbine fully open.

Thus, in one embodiment, the valve is constructed and operable such that the rotary element substantially fully prevents exhaust gases from passing through the turbine in a turbine-closed condition of the valve, the primary through-passage being open to flow in the turbine-closed position.

In one embodiment, the valve includes a valve housing that is integral with the turbine housing. The valve housing can comprise a Y-member having a first leg and having second and third legs that branch off from the first leg, the first leg being connected to the exhaust line, the second leg being connected to the primary through-passage that directly supplies exhaust gases to the catalytic treatment device, and the third leg being connected to the bypass passage that supplies exhaust gases to the turbine.

Valves of various constructions can be employed. In one embodiment described herein, the valve comprises a fixed valve seat defining at least one orifice, and the rotary element of the valve comprises a rotary valve member defining at least one orifice, the valve member and valve seat being disposed in the second leg of the Y-member. The valve member is disposed against the valve seat and is rotatable about an axis for selectively varying a degree of alignment between the respective orifices defined through each of the valve seat and valve member. The valve member includes a blocker extending therefrom, the blocker being movable into and out of the third leg of the Y-member with rotation of the valve member in one direction or an opposite direction.

In one embodiment, the turbine housing defines a slot through which the blocker is movable. The slot is downstream of the point where the second leg of the Y-member branches off from the first leg of the Y-member.

In a particular implementation, the valve member comprises a generally flat disk and the blocker extends from the disk generally parallel to the axis about which the valve member is rotatable and has a generally circular-arc shape about the axis, and the slot in the turbine housing similarly has a generally circular-arc shape about the axis.

More generally, regardless of the specific construction of the valve, the valve member in some embodiments of the invention is movable to a plurality of different positions, including at least: (1) a phase 1 position, constituting an exhaust line-open/turbine-closed position allowing flow through the primary through-passage and substantially preventing flow through the bypass passage into the turbine volute; and (2) a phase 2 position, constituting an exhaust line-closed/turbine-open position substantially preventing flow through the primary through-passage and presenting no substantial impediment to flow through the bypass passage into the turbine volute.

In one embodiment, the valve member is further movable to a phase 3 position, constituting an exhaust line-open/turbine-open position allowing a relatively low rate of flow through the primary through-passage and presenting no substantial impediment to flow through the bypass passage into the turbine volute.

The valve member can be further movable to a phase 4 position, constituting an exhaust line-open/turbine-open position allowing a relatively higher rate of flow through the primary through-passage than that of the phase 3 position, and presenting no substantial impediment to flow through the bypass passage into the turbine volute.

In order to prevent oil leakage in the turbocharger, the valve member in the phase 1 position can be configured so that it does not completely block flow into the turbine volute but allows a trickle flow sufficient to keep the turbine wheel rotating at a low speed.

The present disclosure also describes a method of operating a turbocharged engine system having a single-stage turbocharger and an exhaust gas treatment device disposed downstream of the turbocharger, a turbine of the turbocharger being arranged to receive exhaust gases from the engine via a 3-way valve having a movable valve member, the exhaust gas treatment device being connected to a primary through-passage of the valve, the turbine being connected to a bypass passage of the valve. The method comprises the steps of:

during a cold start of the engine, positioning the valve member in a phase 1 position such that substantially all of the exhaust gases produced by the engine pass through the primary through-passage of the valve and proceed directly to the exhaust gas treatment device and are substantially prevented from passing through the bypass passage to the turbine; and as the engine warms up, moving the valve member toward a phase 2 position to gradually reduce a flow rate of the exhaust gases through the primary through-passage and allow an increasing amount of flow through the bypass passage to the turbine.

The method can include a further step, in a part-power engine operating condition, of positioning the valve member in a phase 3 position to allow a relatively low rate of flow through the primary through-passage, and to present no substantial impediment to flow through the bypass passage to the turbine.

The valve member can be further positionable in a phase 4 position that allows a relatively higher rate of flow through the primary through-passage and that presents no substantial impediment to flow through the bypass passage to the turbine. In this case, the method can further comprise the step, in a rated-power engine operating condition, of positioning the valve member in a selected position ranging between the phase 3 and phase 4 positions.

Thus, during a catalyst light-off phase of turbocharger operation, the degree of openness of the bypass passage of the valve can be controlled as an aid to regulating the heating up of the catalyst. In particular, during the catalyst light-off phase, the valve can substantially prevent flow to the turbine.

During a boost management phase of turbocharger operation, the degree of openness of the 3-way valve can be controlled as an aid to regulating an amount of boost provided by the turbocharger. In the boost management phase, the blocker is moved out of the way and thus does not impede flow to the turbine.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
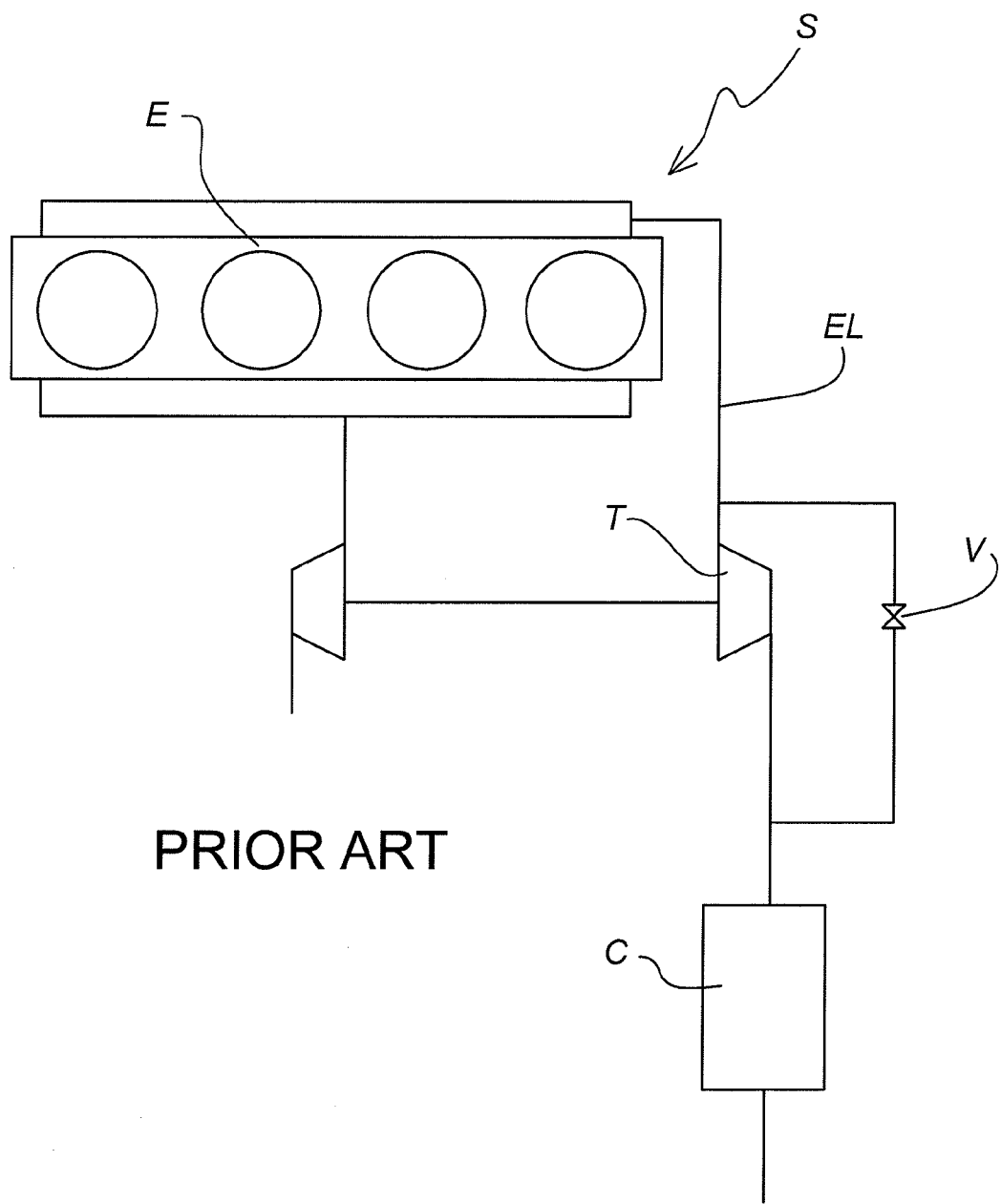
FIG. 1 is a schematic depiction of a single-turbocharged engine system in accordance with prior art.

As illustrated in FIG. 1, in prior art turbocharged engine systems employing a downstream catalyst, such as the exemplary system S depicted in the drawing, the turbine T is in the exhaust line EL that routes exhaust gases from the engine E to the catalyst C. As such, the exhaust gases must pass through the turbine before reaching the catalyst. While such systems typically include a bypass valve or waste gate V that can be activated to route the majority of the exhaust gas stream to the catalyst without having to pass through the turbine, conventional bypass valves or waste gates still allow a considerable amount of exhaust gas to pass through the turbine. This exhaust gas is cooled by the turbine and therefore slows the heating of the catalyst, delaying the attainment of light-off temperature.

Figure 2:
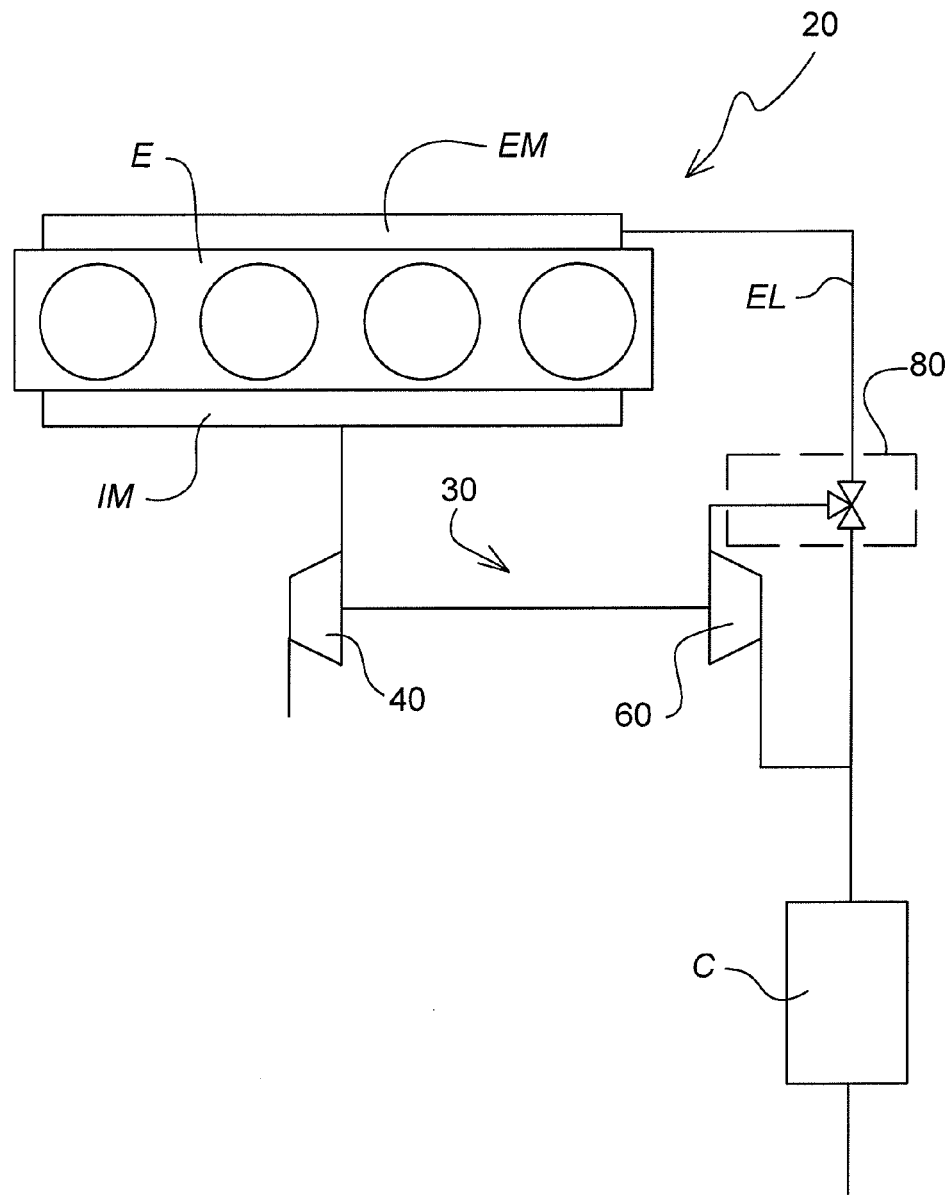
FIG. 2 is a schematic depiction of a single-turbocharged engine system in accordance with an embodiment of the present invention.

FIG. 2 is a schematic diagram of a turbocharged engine system 20 in accordance with an embodiment of the present invention. The system includes an engine E, a turbocharger 30, and a catalytic exhaust gas treatment device or "catalyst" C. The turbocharger 30 includes a compressor 40 that receives fresh air, compresses the air, and delivers the compressed air to an intake manifold IM of the engine. The turbocharger further includes a turbine 60 that receives exhaust gases from an exhaust manifold EM of the engine. Unlike the prior art system of FIG. 1, the turbine 60 is not directly in the exhaust line EL from the exhaust manifold to the catalyst. Rather, a 3-way valve assembly 80 is directly in the line EL, and the turbine is in a bypass passage that bypasses the direct flow path through the 3-way valve to the catalyst. The 3-way valve assembly 80 is structured and arranged so that its position can be regulated to alternatively (1) substantially block flow of exhaust gases to the turbine 60 and fully open the direct flow path through the valve to the catalyst, (2) allow flow of exhaust gases to the turbine while preventing direct flow of exhaust gases to the catalyst, (3) allow flow of exhaust gases to the turbine and partially open the direct flow path to the catalyst, or (4) allow flow of exhaust gases to the turbine and fully open the direct flow path to the catalyst.

FIGS. 3 through 8 depict an assembly of the turbocharger 30 and the 3-way valve assembly 80 in accordance with an embodiment of the invention. The single-stage turbocharger 30 comprises a compressor wheel 32 mounted within a compressor housing 34 and a turbine wheel 62 mounted within a turbine housing 64 and connected to the compressor wheel by a shaft. The turbine housing defines an exhaust gas inlet 66 connected to a turbine volute 68 that surrounds the turbine wheel. The turbine housing further defines an exhaust gas exit 70 for discharging exhaust gases that have passed through the turbine wheel.

Figure 5:
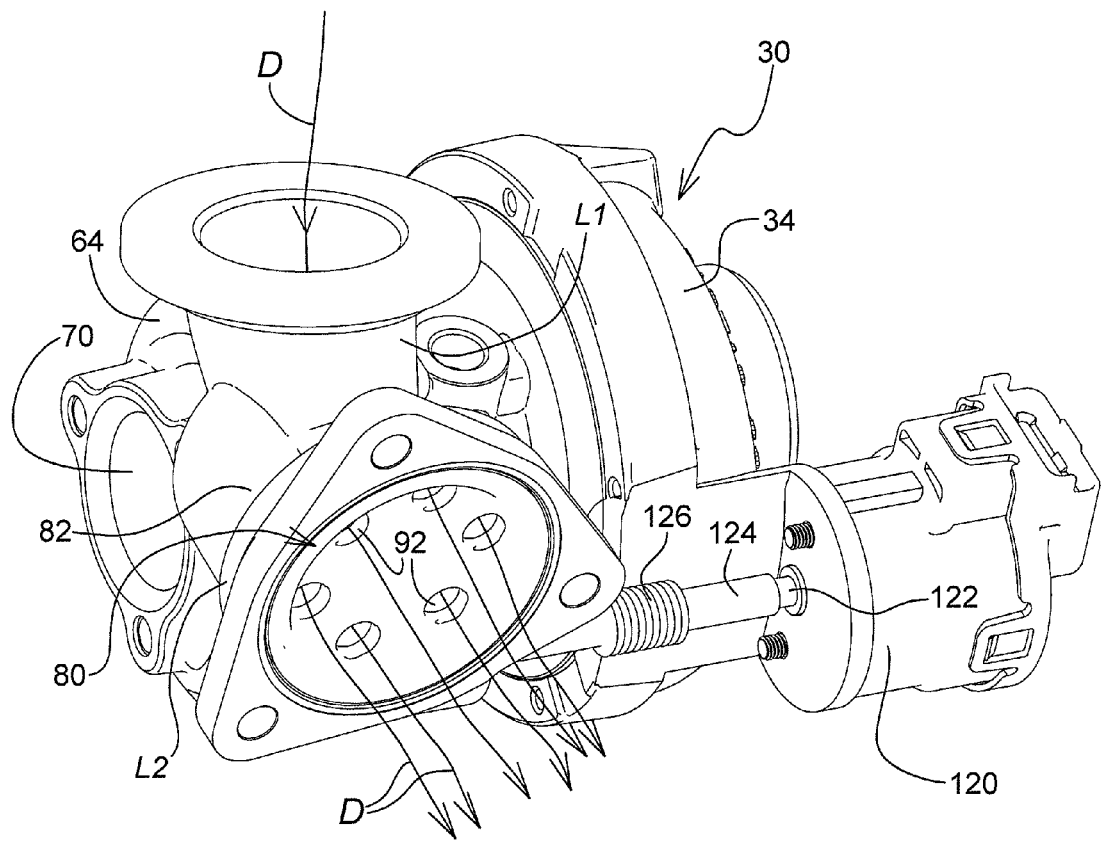
FIG. 5 is a perspective view of the turbocharger and valve assembly of FIG. 4.
Figure 6:
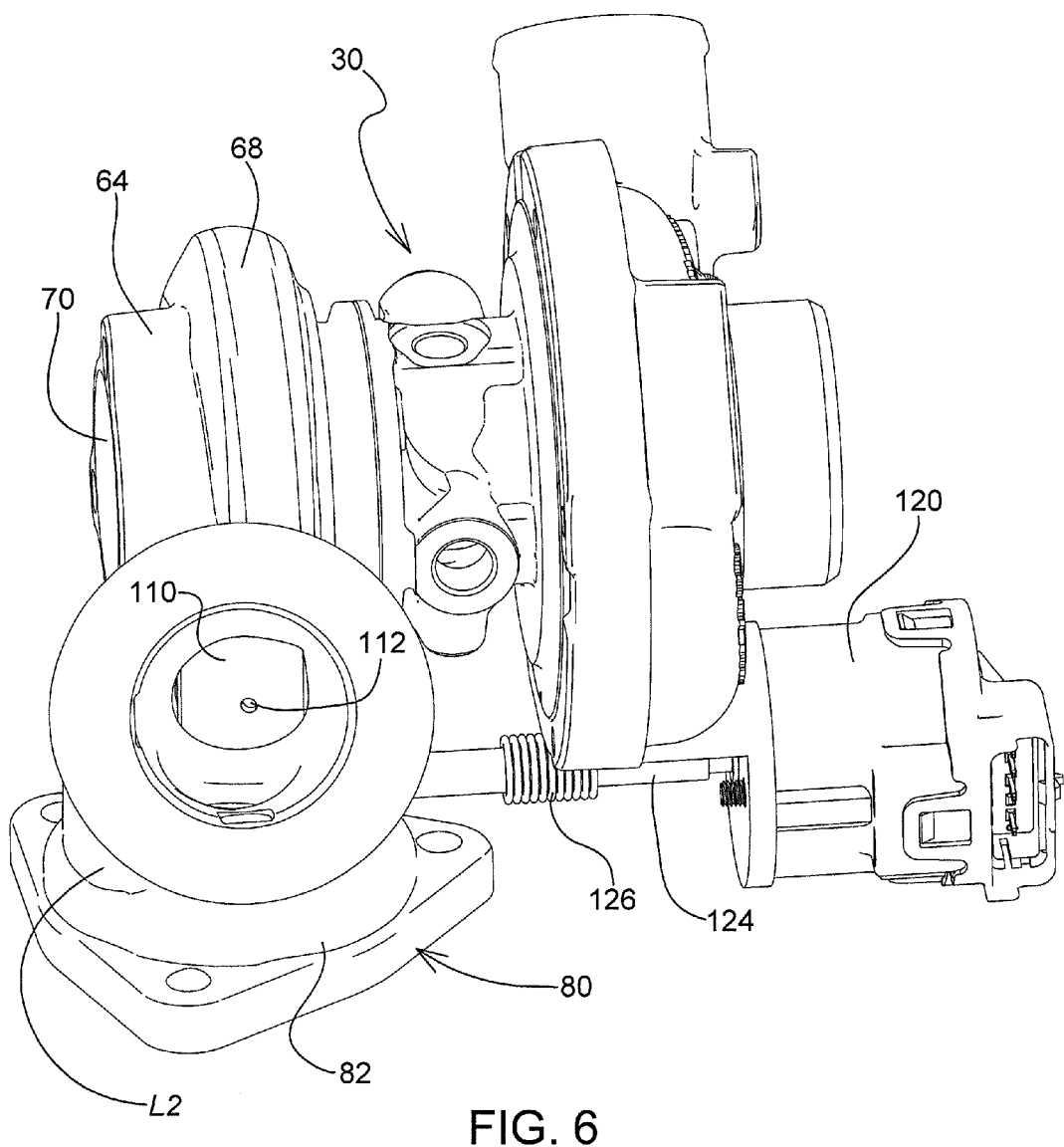
FIG. 6 is a perspective view of the turbocharger and valve assembly of FIG. 5, looking in a direction into the exhaust gas inlet of the turbine housing, wherein the 3-way valve is in a Phase 1 position to substantially block the turbine from receiving exhaust gas and to allow the exhaust gas to flow directly out from the turbine housing to a catalyst (not shown)

The 3-way valve assembly 80 includes a housing 82 in the form of a Y-member. The valve housing 82 preferably is integral with the turbine housing 64. The valve housing comprises a Y-member having a first leg L1 and having second and third legs L2 and L3 that branch off from the first leg. The first leg L1 is connected to the exhaust line EL (FIG. 1), the second leg L2 is connected to the primary through-passage that goes directly to the catalyst, and the third leg L3 is connected to the bypass passage that leads into the inlet 66 to the turbine. The legs L1 and L2 together define a primary through-passage that, when open, conveys exhaust gases from the exhaust gas manifold directly to the catalytic exhaust gas treatment device. This direct flow to the catalyst is illustrated in FIG. 5 by the branched arrow D. The third leg L3 (FIG. 8) defines a bypass passage that, when open, diverts a bypass flow of exhaust gases away from the primary through-passage and into the turbine exhaust gas inlet 66.

Figure 4:
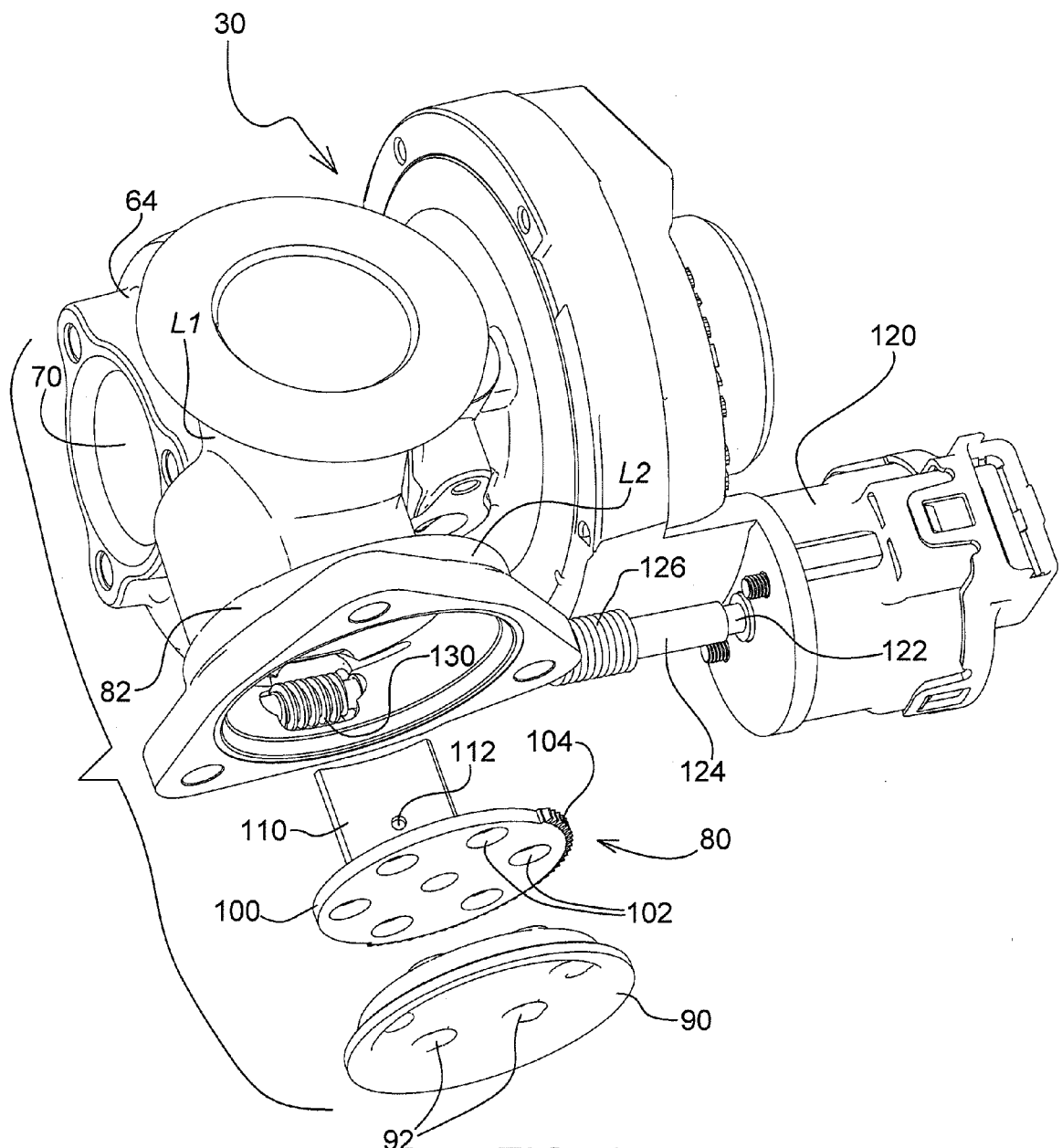
FIG. 4 is a partially exploded perspective view of the turbocharger and valve assembly of FIG. 3.

Regulation of flow through the valve is effected by a rotary valve assembly best seen in FIG. 4. The rotary valve assembly comprises a fixed valve seat 90 defining at least one orifice 92, and a rotary valve member 100 defining at least one orifice 102. The valve member and valve seat are disposed in a space defined in the second leg L2 of the valve housing. The valve member 100 is disposed against the valve seat 90 and is rotatable about an axis for selectively varying a degree of alignment between the respective orifices 92 and 102 defined through each of the valve seat and valve member. The valve member 100 also includes a blocker 110 extending therefrom in a direction generally parallel to the axis about which the valve member rotates. The blocker is a plate-shaped member, and is movable into and out of the third leg L3 with rotation of the valve member in one direction or an opposite direction. The turbine housing 64 defines a slot or space through which the blocker is movable so that it can be moved from a position in which it substantially blocks flow of exhaust gases into the turbine housing inlet 66 (FIGS. 6 and 7) to a position in which the blocker is withdrawn and allows flow into the inlet 66 (FIG. 8). This slot is downstream of the point where the second leg of the Y-member branches off from the first leg of the Y-member.

The valve member 100 in one embodiment comprises a generally flat disk, and the blocker 110 extends from the disk generally parallel to the axis about which the valve member is rotatable and has a generally circular-arc shape about the axis. Correspondingly, the slot in the turbine housing that receives the blocker has a generally circular-arc shape about the axis.

The rotational position of the valve member 100 is controllable to selectively open or close, and to vary a degree of opening or closing of, each of the primary through-passage and the bypass passage of the valve. More particularly, changing the rotational position of the valve member 100 changes the degree of alignment between the orifices 102 in the valve member and the corresponding orifices 92 in the valve seat 90, and also changes the position of the blocker 110 with respect to the turbine inlet 66.

Figure 3:
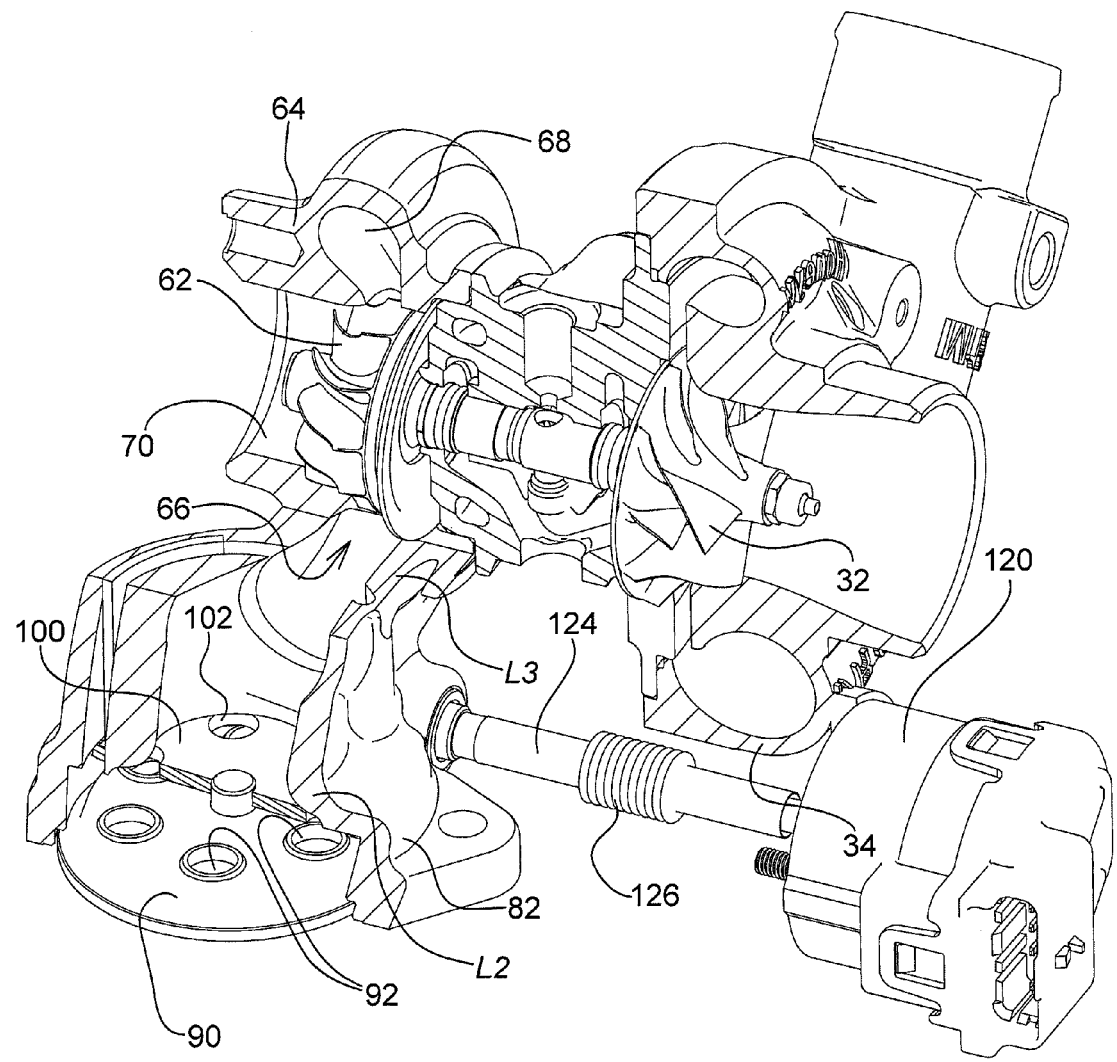
FIG. 3 is an axially sectioned perspective view of one embodiment of a turbocharger and valve assembly that can be used in the system of FIG. 2.

Rotation of the valve member 100 is effected in the illustrated embodiment by a rotary actuator 120. The rotary output shaft 122 of the actuator is coupled to one end of a rotary drive member 124 that includes a flexible portion in the form of a bellows 126. The other end of the rotary drive member 124 penetrated through the second leg L2 of the valve housing 82 and is connected to or defines a worm gear 130, as best seen in FIG. 3. The worm gear 130 is arranged to mesh with a gear 104 formed on the outer peripheral edge of the rotary valve member 100 (FIG. 8). Thus, rotation of the actuator 120 causes the worm gear 130 to be rotated about its axis, which drives the valve member gear 104 to cause the valve member to rotate about its axis. Various positions of the valve member are now described with reference to FIGS. 6 through 10.

Figure 7:
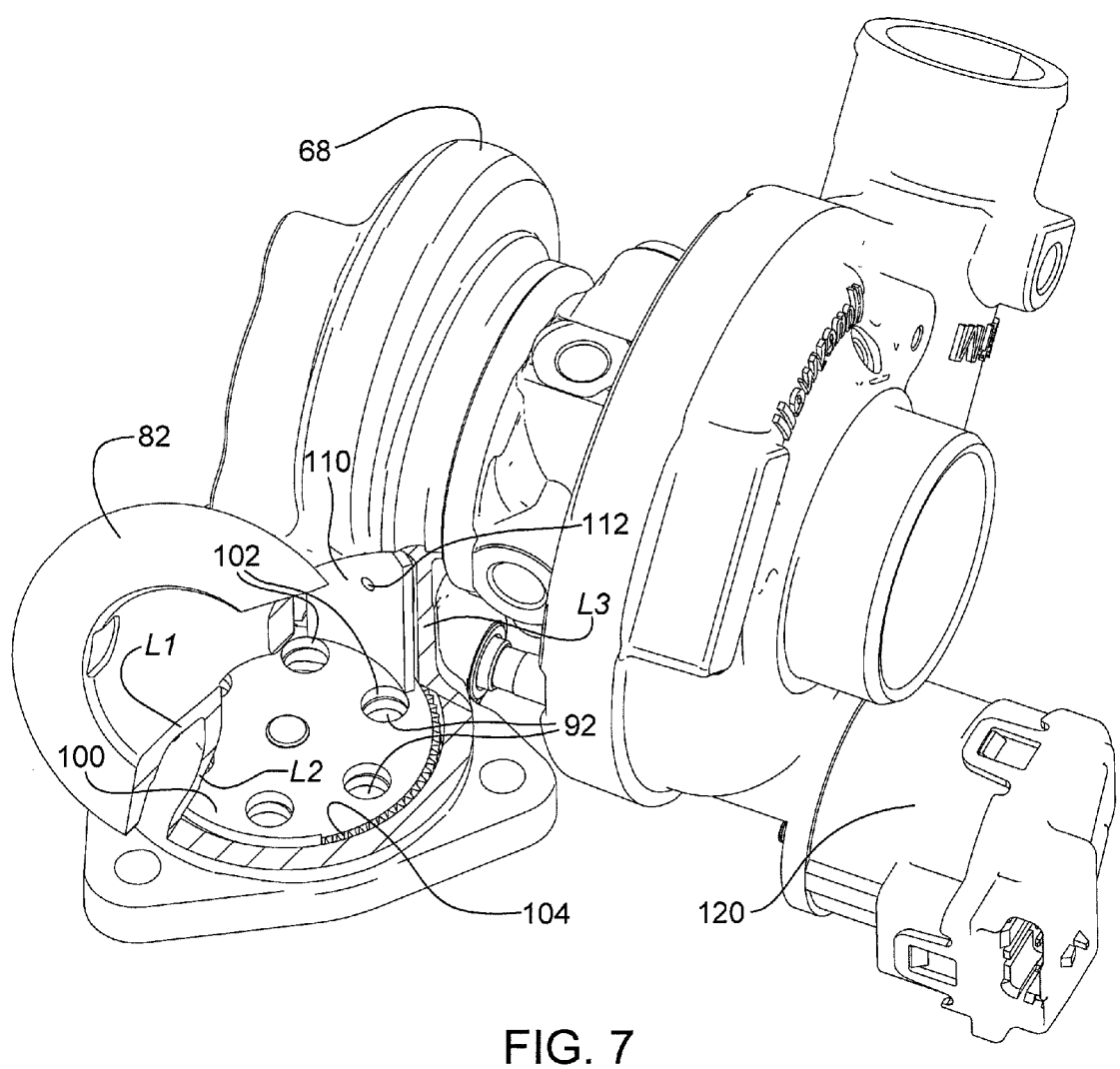
FIG. 7 is a perspective view of the turbocharger and valve assembly in the same condition as FIG. 6, from a different angle and with the turbine housing partially cut away to show the 3-way valve in the Phase 1 position.
Figure 8:
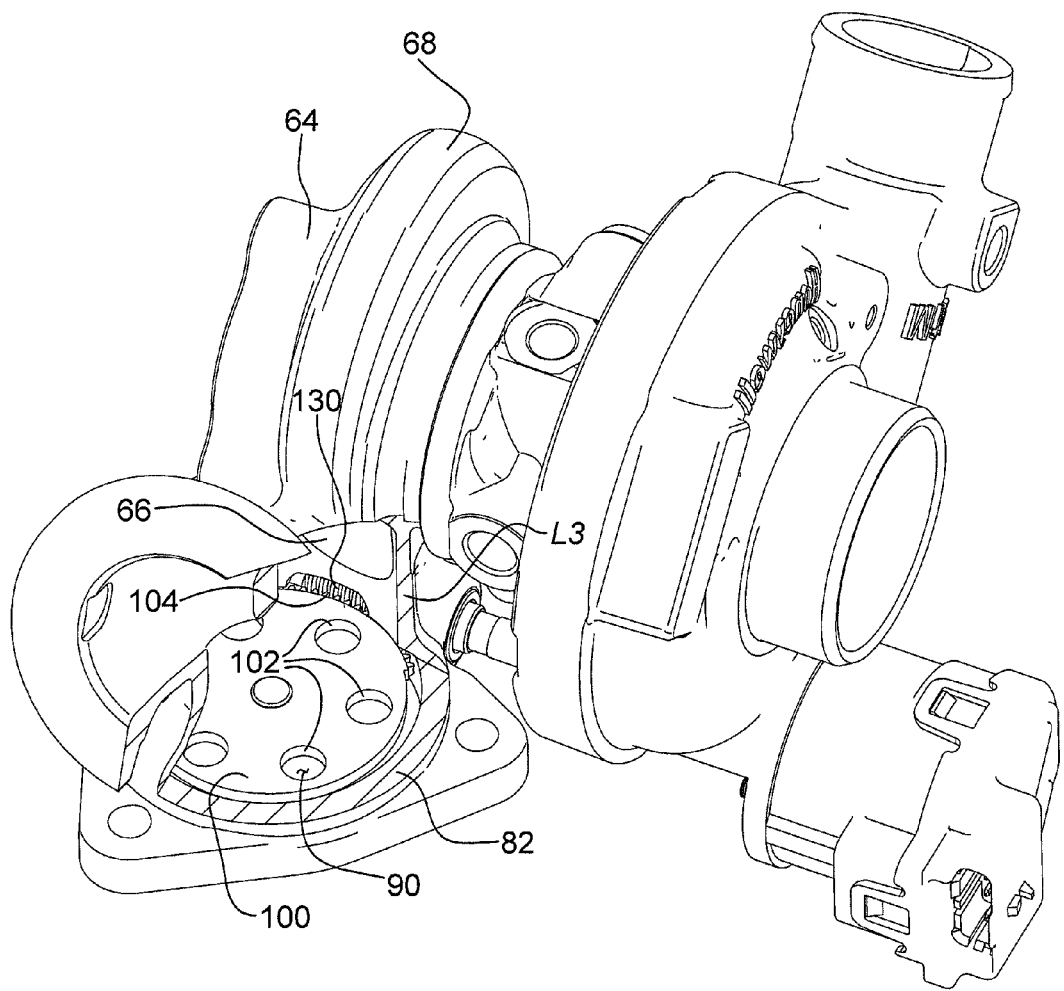
FIG. 8 is a perspective view similar to FIG. 7, with the 3-way valve in a Phase 2 position in which the turbine is open to flow and the direct flow path to the catalyst is closed, such that all exhaust gas must pass through the turbine wheel before going to the catalyst.

In FIG. 7, the rotary valve member is in a position, denoted as a Phase 1 position, in which the exhaust gases entering from the exhaust line EL into the first leg L1 of the valve housing are able to flow directly through the aligned orifices 92 and 102 of the valve, and the blocker 110 substantially prevents flow of exhaust gases to the turbine. As shown, the blocker can include a hole 112 (or possibly multiple holes) that allow a small amount of flow to the turbine so as to keep the turbine wheel spinning at a slow speed, which is beneficial to the oil seals for the turbocharger. Otherwise, however, the turbine is substantially closed off.

Figure 9:
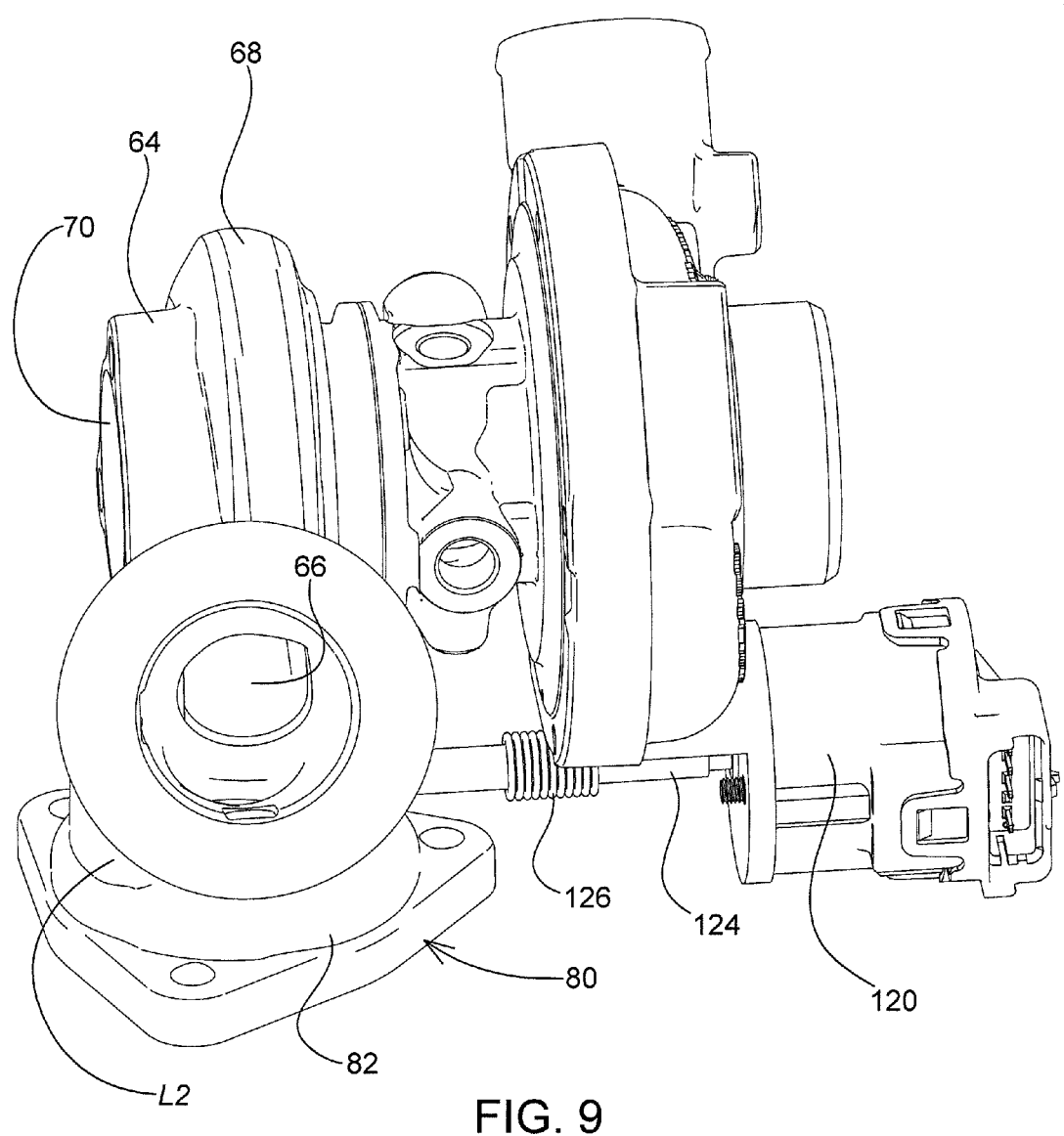
FIG. 9 is a perspective view similar to FIG. 6, with the 3-way valve in the Phase 2 position.

FIGS. 8 and 9 show a Phase 2 position of the rotary valve member 100, in which there is no overlap between the valve member orifices 102 and the orifices in the valve member 90 such that exhaust gases are prevented from flowing directly to the catalyst. In this Phase 2 position, the blocker has been withdrawn into the slot in the turbine housing such that the inlet 66 to the turbine is fully open. Thus, exhaust gases entering the valve housing through the first leg L1 will flow through the turbine and will be discharged through the exit 70 of the turbine housing into a conduit (not shown) that feeds into the line carrying exhaust gases to the catalyst.

Figure 10:
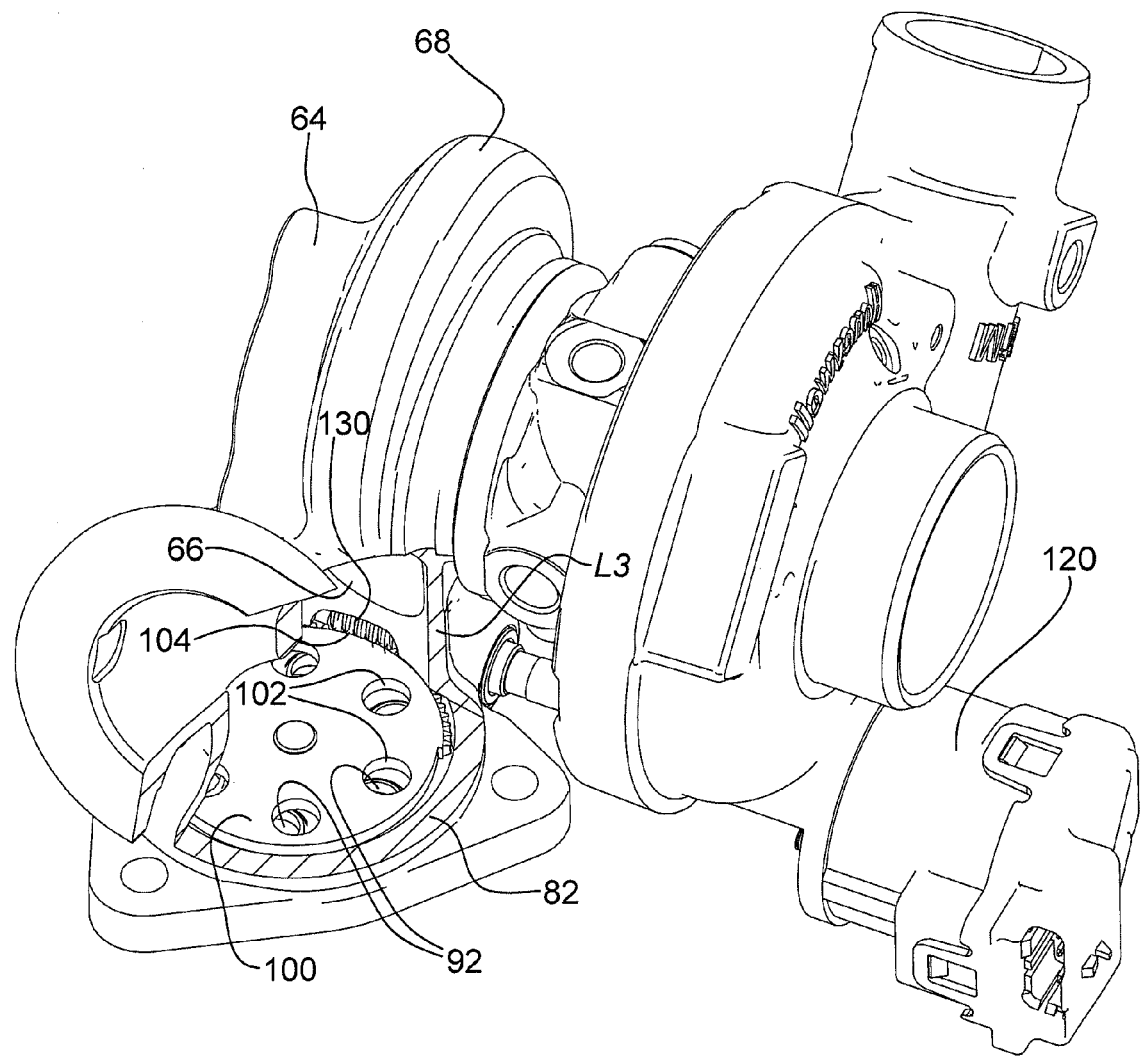
FIG. 10 is a perspective view similar to FIG. 7, showing the 3-way valve in a Phase 3 position in which the turbine is open and the direct flow path to the catalyst is partially open for regulating the direct flow.

FIG. 10 shows a Phase 3 position in which the blocker is still withdrawn to fully open the turbine inlet 66, but there is now only partial alignment between the orifices 92 and 102. The degree of partial alignment allows the direct flow to the catalyst to be regulated.

Figure 11:
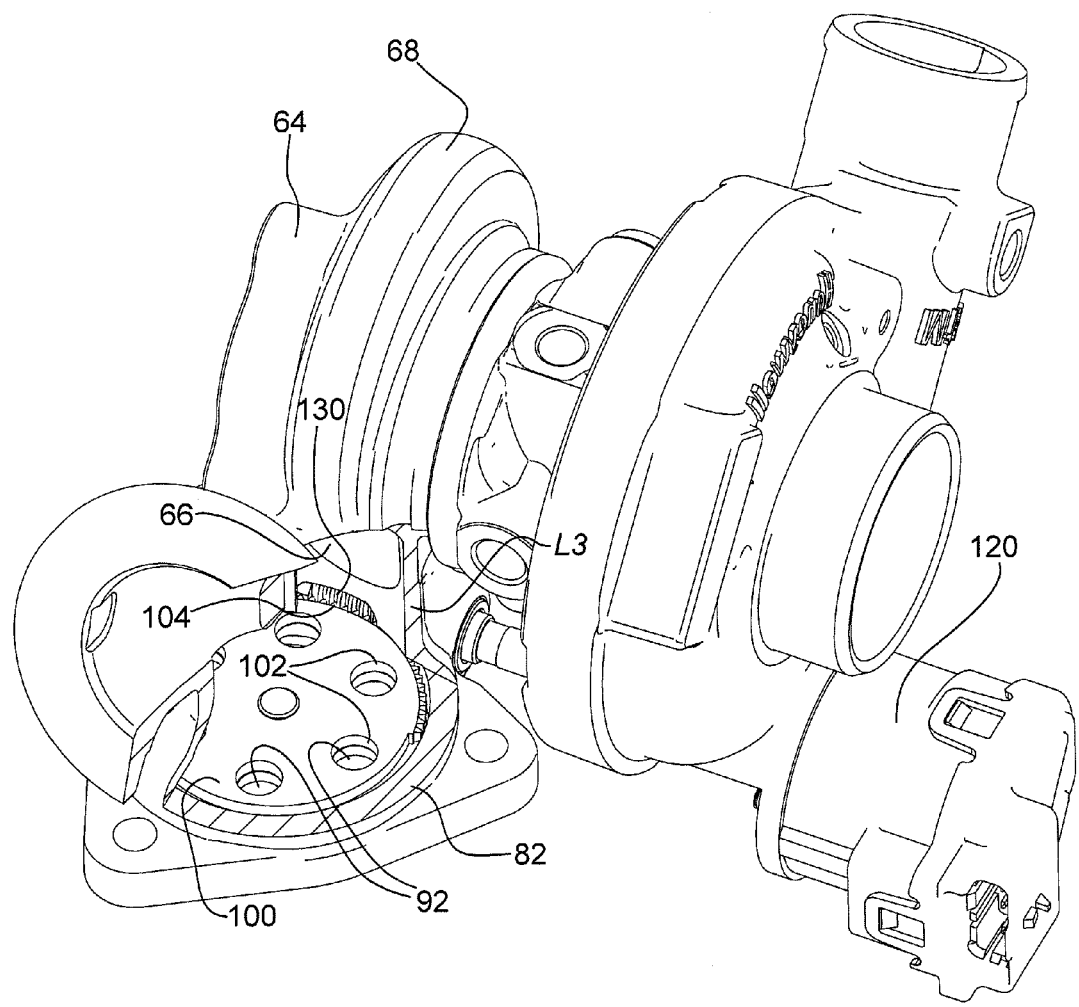
FIG. 11 is a perspective view similar to FIG. 10, with the 3-way valve in a Phase 4 position in which the turbine is open and the direct flow path to the catalyst is fully open.

FIG. 11 shows a Phase 4 position in which, again, the turbine inlet 66 is fully open, and now there is complete alignment between the orifices 92 and 102 so that the valve presents the least amount of impediment to the direct flow to the catalyst.

It will be recognized that when the valve member 100 is rotated counterclockwise from the Phase 1 position in FIG. 7, the primary through-passage (defined by the aligned orifices 92 and 102) will begin to close and simultaneously the blocker 110 will begin to move so as to open the bypass passage to the turbine inlet.

The operation of the turbocharged engine system is now described with reference to the drawings. During a cold start of the engine, the valve member 100 is positioned in the Phase 1 position (FIG. 6) such that substantially all of the exhaust gases produced by the engine pass through the primary through-passage of the valve and proceed directly to the exhaust gas treatment device and are substantially prevented from passing through the bypass passage to the turbine. As the engine warms up, the valve member 100 is moved toward the Phase 2 position (FIG. 7) to gradually reduce a flow rate of the exhaust gases through the primary through-passage and allow an increasing amount of flow through the bypass passage to the turbine.

In a part-power engine operating condition, the valve member 100 is positioned in the Phase 3 position (FIG. 10) to allow a relatively low rate of flow through the primary through-passage, and to present no substantial impediment to flow through the bypass passage to the turbine.

In a rated-power engine operating condition, the valve member can be positioned in a selected position ranging between the Phase 3 (FIG. 10) and Phase 4 (FIG. 11) positions.

In summary, during a catalyst light-off phase of turbocharger operation, the degree of openness of the bypass passage of the valve can be controlled as an aid to regulating the heating up of the catalyst. In particular, during the catalyst light-off phase, the valve can substantially prevent flow to the turbine.

During a boost management phase of turbocharger operation, the degree of openness of the 3-way valve can be controlled as an aid to regulating an amount of boost provided by the turbocharger. In the boost management phase, the blocker is moved out of the way and thus does not impede flow to the turbine.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A single-stage turbocharger assembly, comprising:
a catalytic exhaust gas treatment device that requires heating to at least a minimum temperature in order to become effective for treating exhaust gases to reduce emissions;
an exhaust line arranged for conveying exhaust gases from an engine to the catalytic exhaust gas treatment device;
a 3-way valve disposed in the exhaust line, the valve defining a primary through-passage that, when open, conveys exhaust gases from the exhaust line directly to the catalytic exhaust gas treatment device, the valve further defining a bypass passage that, when open, diverts a bypass flow of exhaust gases away from the primary through-passage; and
a single-stage turbocharger comprising a compressor wheel mounted within a compressor housing and a turbine wheel mounted within a turbine housing and connected to the compressor wheel by a shaft, the turbine housing defining an exhaust gas net connected to a turbine volute that surrounds the turbine wheel, the turbine housing further defining an exhaust gas exit for discharging exhaust gases that have passed through the turbine wheel;
wherein the exhaust gas inlet of the turbine housing is connected to the bypass passage of the valve, and the exhaust gas exit of the turbine housing is connected to the exhaust line at a point spaced downstream from the valve and upstream from the catalytic exhaust gas treatment device;
wherein the valve includes a valve housing that is integral with the turbine housing,
wherein the valve housing comprises a Y-member having a first leg and having second and third legs that branch off from the first leg, the first leg being connected to the exhaust line, the second leg being connected to the primary through-passage, and the third leg being connected to the bypass passage,
wherein the valve includes a rotary element whose position is controllable to selectively open or dose, and to vary a degree of opening or closing of, each of the primary through-passage and the bypass passage of the valve,
wherein the valve is constructed such that the rotary element is rotatable over a first range of rotary movement and over a further second range of rotary movement, the first range including a position of the rotary element in which the bypass passage is fully closed, and
wherein over the second range the bypass passage is fully open regardless of changes in the degree of opening or closing of the primary through-passage,
wherein the valve comprises a fixed valve seat defining at least one orifice, and
wherein the rotary element of the valve comprises a rotary valve member defining at least one orifice, the rotary valve member and the fixed valve seat being disposed in the second leg of the Y-member, the rotary valve member being disposed against the fixed valve seat and being rotatable about an axis for selectively varying a degree of alignment between the respective orifices defined through each of the fixed valve seat and the rotary valve member, and
wherein the rotary valve member includes a blocker extending therefrom, the blocker being movable into and out of the third leg of the Y-member with rotation of the rotary valve member in one direction or an opposite direction.

2. The single-stage turbocharger assembly of claim 1, wherein the turbine housing defines a slot through which the blocker is movable.

3. The single-stage turbocharger assembly of claim 2, wherein the slot is downstream of the point where the second leg of the Y-member branches off from the first leg of the Y-member.

4. The single-stage turbocharger assembly of claim 3, wherein the valve member comprises a generally flat disk and the blocker extends from the disk generally parallel to the axis about which the valve member is rotatable and has a generally circular-arc shape about the axis, and the slot in the turbine housing similarly has a generally circular-arc shape about the axis.

5. The single-stage turbocharger assembly of claim 1, wherein the rotary element is movable to a plurality of different positions, including at least:
   a phase 1 position, constituting an exhaust line-open/turbine-closed position allowing flow through the primary through-passage and preventing flow through the bypass passage into the turbine volute; and
   a phase 2 position, constituting an exhaust line-closed/turbine-open position preventing flow through the primary through-passage and allowing flow through the bypass passage into the turbine volute.

6. The single-stage turbocharger assembly of claim 5, wherein the rotary element is further movable to a phase 3 position, constituting an exhaust line-open/turbine-open position allowing a relatively low rate of flow through the primary through-passage and allowing flow through the bypass passage into the turbine volute.

7. The single-stage turbocharger assembly of claim 6, wherein the rotary element is further movable to a phase 4 position, constituting an exhaust line-open/turbine-open position allowing a relatively higher rate of flow through the primary through-passage than that of the phase 3 position, and allowing flow through the bypass passage into the turbine volute.

8. The single-stage turbocharger assembly of claim 5, wherein the rotary element in the phase 1 position does not completely block flow into the turbine volute but allows a trickle flow sufficient to keep the turbine wheel rotating.

9. An assembly for use in a turbocharger, the assembly comprising:
   a 3-way valve defining a primary through-passage and further defining a bypass passage that, when open, diverts a bypass flow of exhaust gases away from the primary through-passage; and
   a turbine housing for housing a turbine wheel, the turbine housing defining an exhaust gas net connected to a turbine volute configured to surround the turbine wheel, the turbine housing further defining an exhaust gas exit for discharging exhaust gases that have passed through the turbine wheel;
      wherein the valve includes a valve housing that is integral with the turbine housing, the valve housing comprising a Y-member having a first leg and having second and third legs that branch off from the first leg, the first leg being configured to be connected to an exhaust line through which exhaust gases are received from an engine, the second leg being connected to the primary through-passage of the valve, and the third leg being connected to the bypass passage of the valve;
      wherein the valve includes a rotary element whose position is controllable to selectively open or close, and to vary a degree of opening or closing of, each of the primary through-passage and the bypass passage of the valve,
      wherein the valve is constructed such that the rotary element is rotatable over a first range of rotary movement and over a further second range of rotary movement, the first range including a position of the rotary element in which the bypass passage is fully closed, and
      wherein over the second range the bypass passage is fully open regardless of changes in the degree of opening or closing of the primary through-passage, and
   wherein the valve comprises a fixed valve seat defining at least one orifice,
      wherein the rotary element comprises a rotary valve member defining at least one orifice, the rotary valve member and the fixed valve seat being disposed in the second leg of the Y-member, the rotary valve member being disposed against the fixed valve seat and being rotatable about an axis for selectively varying a degree of alignment between the respective orifices defined through each of the fixed valve seat and the rotary valve member in order to regulate flow through the primary through-passage of the valve, and
      wherein the rotary, valve member includes a blacker extending therefrom, the blacker being movable into and out of the third leg of the Y-member with rotation of the valve member in one direction or an opposite direction.

10. The assembly of claim 9, the rotary valve member being rotatable to a plurality of different positions, including at least;
   a phase 1 position, constituting an exhaust line-open/turbine-closed position in which the orifices in the fixed valve seat and the rotary valve member are fully aligned thereby allowing flow through the primary through-passage, and in which the blocker is positioned to prevent flow through the bypass passage into the turbine volute; and
   a phase 2 position, constituting an exhaust line-closed/turbine-open position in which the orifices in the fixed valve seat and the rotary valve member are misaligned thereby preventing flow through the primary through-passage, and in which the blocker is positioned to allow flow through the bypass passage into the turbine volute.

11. The assembly of claim 10, wherein the rotary, valve member is further rotatable to a phase 3 position, constituting an exhaust line-open/turbine-open position in which the orifices in the fixed valve seat and the rotary valve member are partially aligned thereby allowing some flow through the primary through-passage, and in which the blocker is positioned to allow flow through the bypass passage into the turbine volute.

12. The assembly of claim 11, wherein the rotary valve member is further rotatable to a phase 4 position, constituting an exhaust line-open turbine-open position in which the orifices in the valve seat and the rotary valve member are fully aligned thereby allowing flow through the primary through-passage, and in which the blocker is positioned to allow flow through the bypass passage into the turbine volute.

13. The assembly of claim 10, wherein the blocker in the phase 1 position does not completely block flow into the turbine volute but allows a trickle flow sufficient to keep the turbine wheel rotating.

14. The assembly of claim 10, wherein the turbine housing defines a slot through which the blacker is movable between the blocking and unblocking positions.

15. The assembly of claim 14, wherein the slot is downstream of the point where the second leg of the Y-member branches off from the first leg of the Y-member.

\* \* \* \* \*